(12) United States Patent  (10) Patent No.: US 8,553,310 B2
Lin et al.  (45) Date of Patent: Oct. 8, 2013

(54) LENS DEVICE WITH AN INTEGRATED SHUTTER UNIT

(75) Inventors: Chih-Hao Lin, Taichung (TW); Wen-Ping Wang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 337 days.

(21) Appl. No.: 12/814,795

(22) Filed: Jun. 14, 2010

(65) Prior Publication Data
US 2011/0043883 A1 Feb. 24, 2011

(30) Foreign Application Priority Data

Aug. 21, 2009 (TW) .............................. 98128244 A

(51) Int. Cl.
*G02F 1/03* (2006.01)
(52) U.S. Cl.
USPC .......................................... 359/233; 396/355
(58) Field of Classification Search
USPC ........... 359/227, 230, 233, 234; 396/355, 357
See application file for complete search history.

(56) References Cited

U.S. PATENT DOCUMENTS

2008/0175584 A1* 7/2008 Ohkuma ........................ 396/458

FOREIGN PATENT DOCUMENTS

TW 200715026 4/2007
TW 200844639 11/2008

OTHER PUBLICATIONS

Taiwan Search Report issued in corresponding TW Application No. 098128244 dated Feb. 4, 2013 (8 pages).

* cited by examiner

*Primary Examiner* — Jennifer L. Doak
(74) *Attorney, Agent, or Firm* — Trop, Pruner & Hu, P.C.

(57) ABSTRACT

A lens device includes a base, a lens unit, a dividing plate, a cover plate, a shutter unit, and an actuator unit. The base has a front section with a front surface, a rear section with a rear surface, a lens hole, and a mounting space. The lens unit is disposed in the lens hole, and includes a lens. The dividing plate is mounted on the front section and has a first light hole. The cover plate is mounted on the front section and has a second light hole. The dividing plate and the cover plate define a working space therebetween. The shutter unit includes a first shutter piece pivotally disposed in the working space. The actuator unit is mounted in the mounting space, and includes a rotation portion, and an operating portion formed on the rotation portion and extending into the working space.

12 Claims, 7 Drawing Sheets

LENS DEVICE WITH AN INTEGRATED SHUTTER UNIT

CROSS-REFERENCE TO RELATED APPLICATION

This application claims priority of Taiwanese Application No. 098128244, filed on Aug. 21, 2009.

BACKGROUND OF THE INVENTION

1. Field of the Invention

The present invention relates to a lens device, more particularly to a lens device with an integrated shutter unit.

2. Description of the Related Art

As shown in FIG. 1, WO 2005/036251 A1 discloses a lens device mounted in a cell phone. The lens device includes a framework 1, a plurality of lenses 2 disposed in the framework 1, a base plate 3 connected to the framework 1, a driver 4 secured on an inner surface of the base plate 3 using screws 401, a cover plate 5 secured on an outer surface of the base plate 3 using screws 501, and two shutter pieces 6 disposed between the base plate 3 and the cover plate 5 and driven by the driver 4 to switch between open and closed states. However, this conventional lens device has disadvantages as follows:

i) When being assembled, the driver 4 is secured on the base plate 3 using the screws 401, which is time-consuming. Moreover, the driver 4 is exposed outside the framework 1, which may affect the arrangement of other internal components in the cell phone.

ii) When being assembled, the base plate 3 needs to be connected to a front end of the framework 1, and the cover plate 5 needs to be secured on the base plate 3 using the screws 501. Therefore, assembly is time-consuming. In addition, the base plate 3 is exposed outside the framework 1 and its thickness must be sufficient to allow the screws 501 to be securely engaged thereto. This thickness of the base plate 3 together with the thicknesses of the framework 1 and the cover plate 5 cause the overall thickness of the lens device to be increased when these elements are assembled together. Hence, the internal space in the cell phone is not efficiently utilized.

SUMMARY OF THE INVENTION

Therefore, the object of the present invention is to provide a lens device with an integrated shutter unit, which is minimized in thickness and is easy to assemble.

Accordingly, a lens device of the present invention comprises a base, a lens unit, a dividing plate, a cover plate, a shutter unit, and an actuator unit. The base has a front section with a front surface, a rear section with a rear surface, a lens hole that extends through the front and rear sections along an axial direction of the base, and a mounting space that is formed inwardly from the front section and that is spaced apart from the lens hole. The lens unit is disposed in the lens hole, includes a lens, and has an optical axis. The dividing plate is mounted on the front section of the base and has a first light hole aligned with the optical axis of the lens unit. The cover plate is mounted on the front section of the base and has a second light hole aligned with the first light hole. The dividing plate and the cover plate define a working space therebetween. The shutter unit includes a first shutter piece pivotally disposed in the working space. The actuator unit is mounted in the mounting space, and includes a rotation portion, and an operating portion formed on the rotation portion and extending into the working space. The operating portion is linked with the first shutter piece and is driven by the rotation portion to move the first shutter piece between an open position away from the first and second light holes and a closed position covering the first and second light holes.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
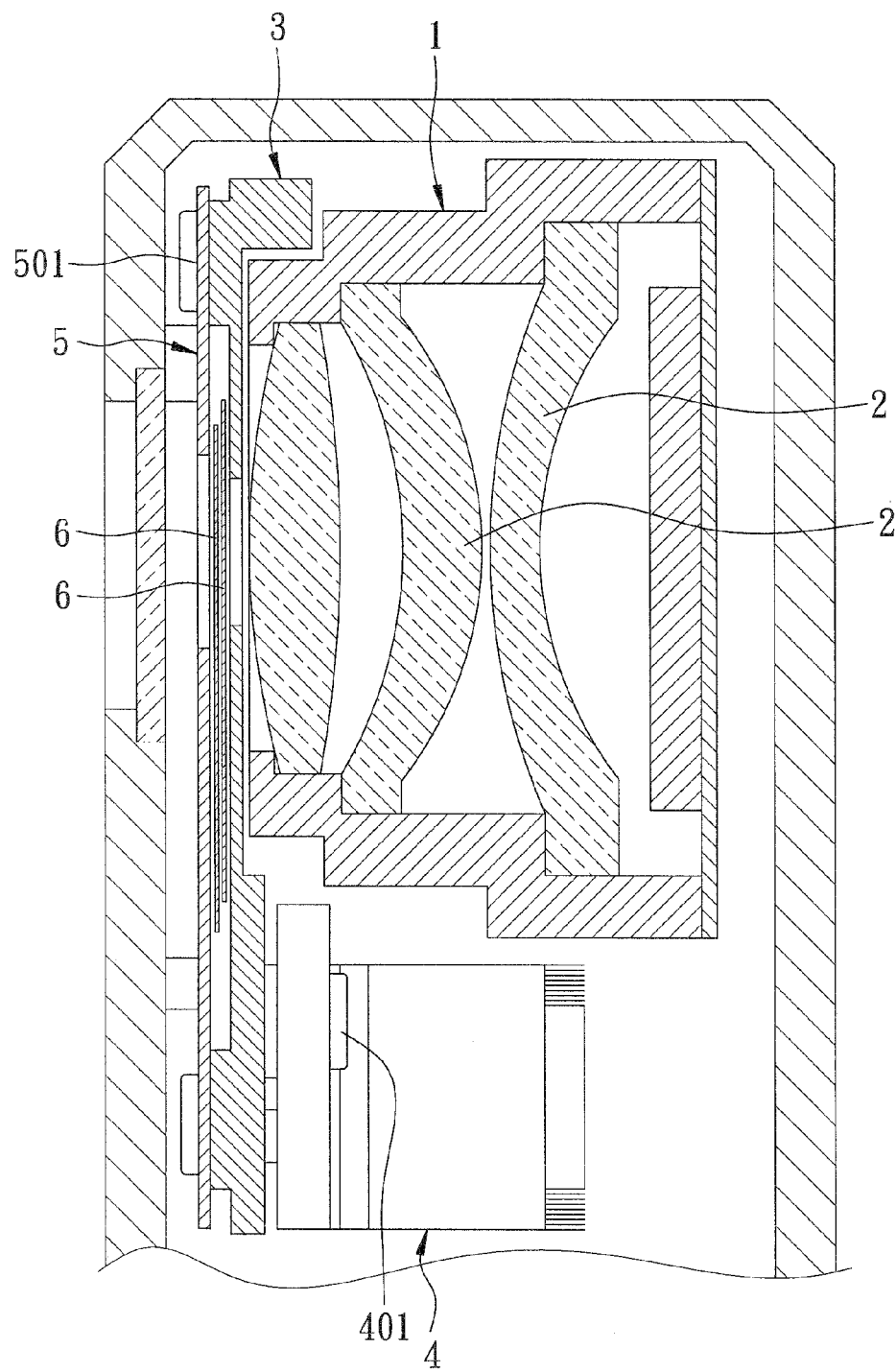
FIG. 1 is a fragmentary schematic sectional view of a conventional lens device.
Figure 2:
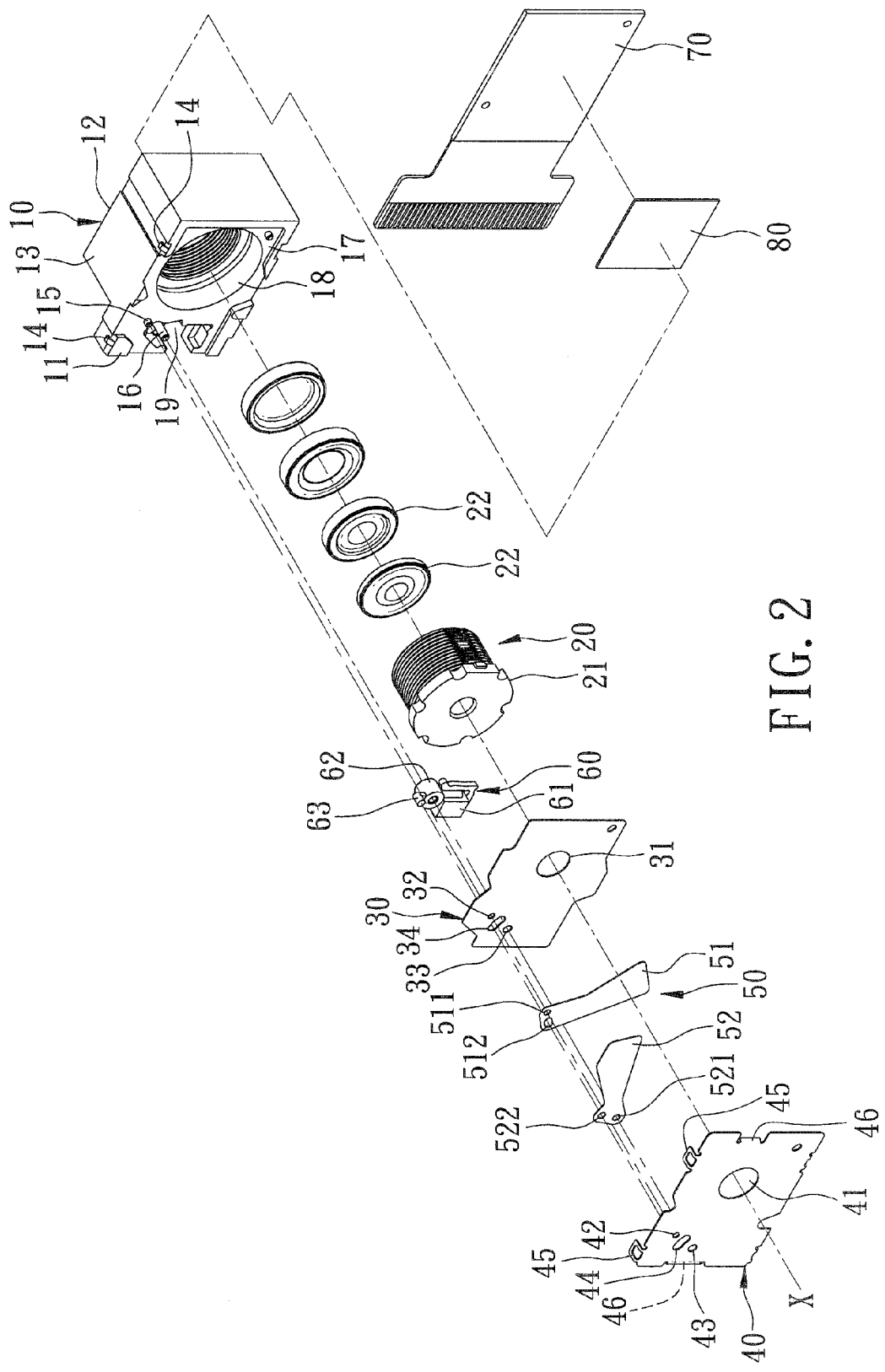
FIG. 2 is an exploded perspective view of a lens device according to a preferred embodiment of the present invention.
Figure 3:
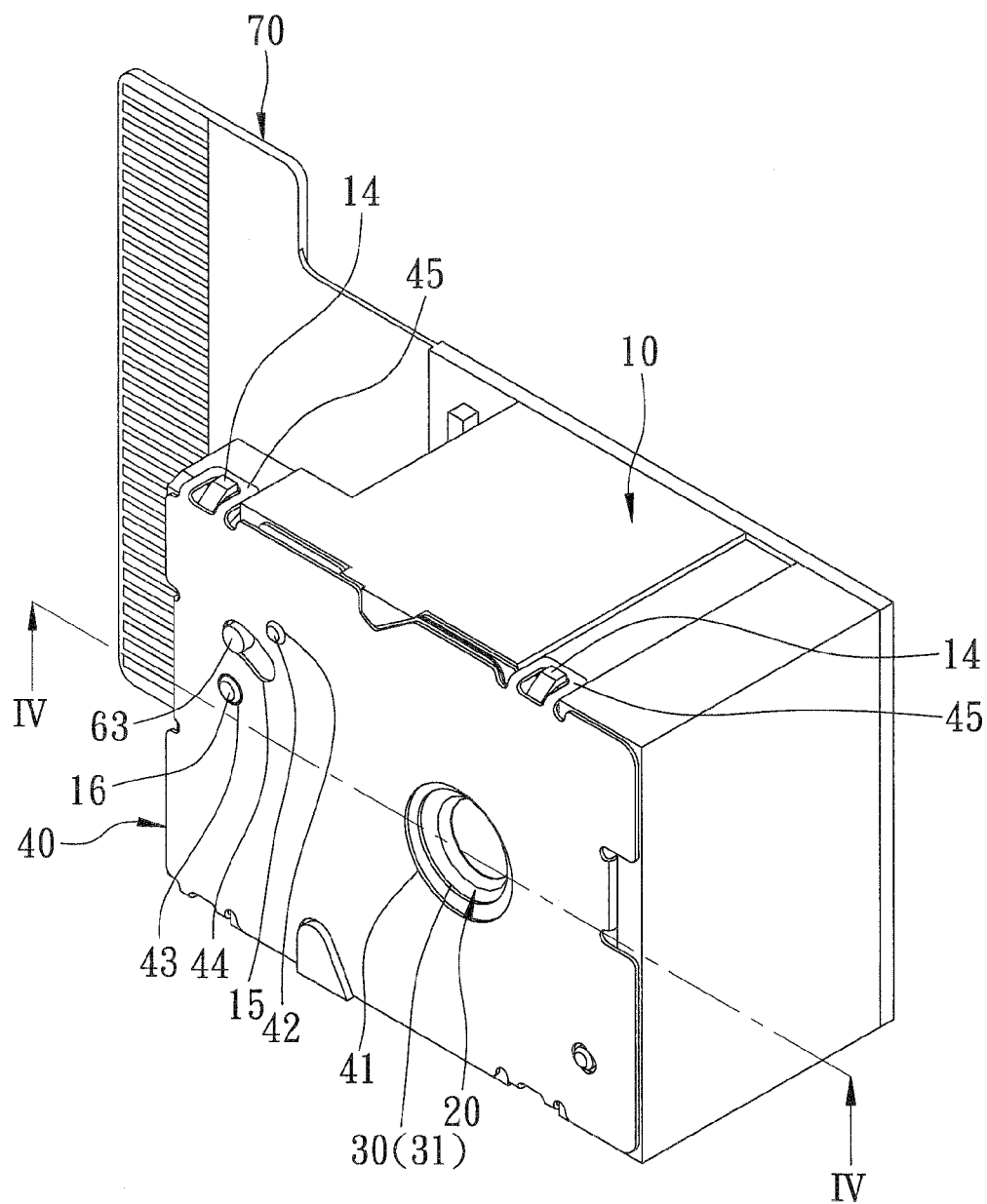
FIG. 3 is a front perspective view of the preferred embodiment of the lens device.
Figure 4:
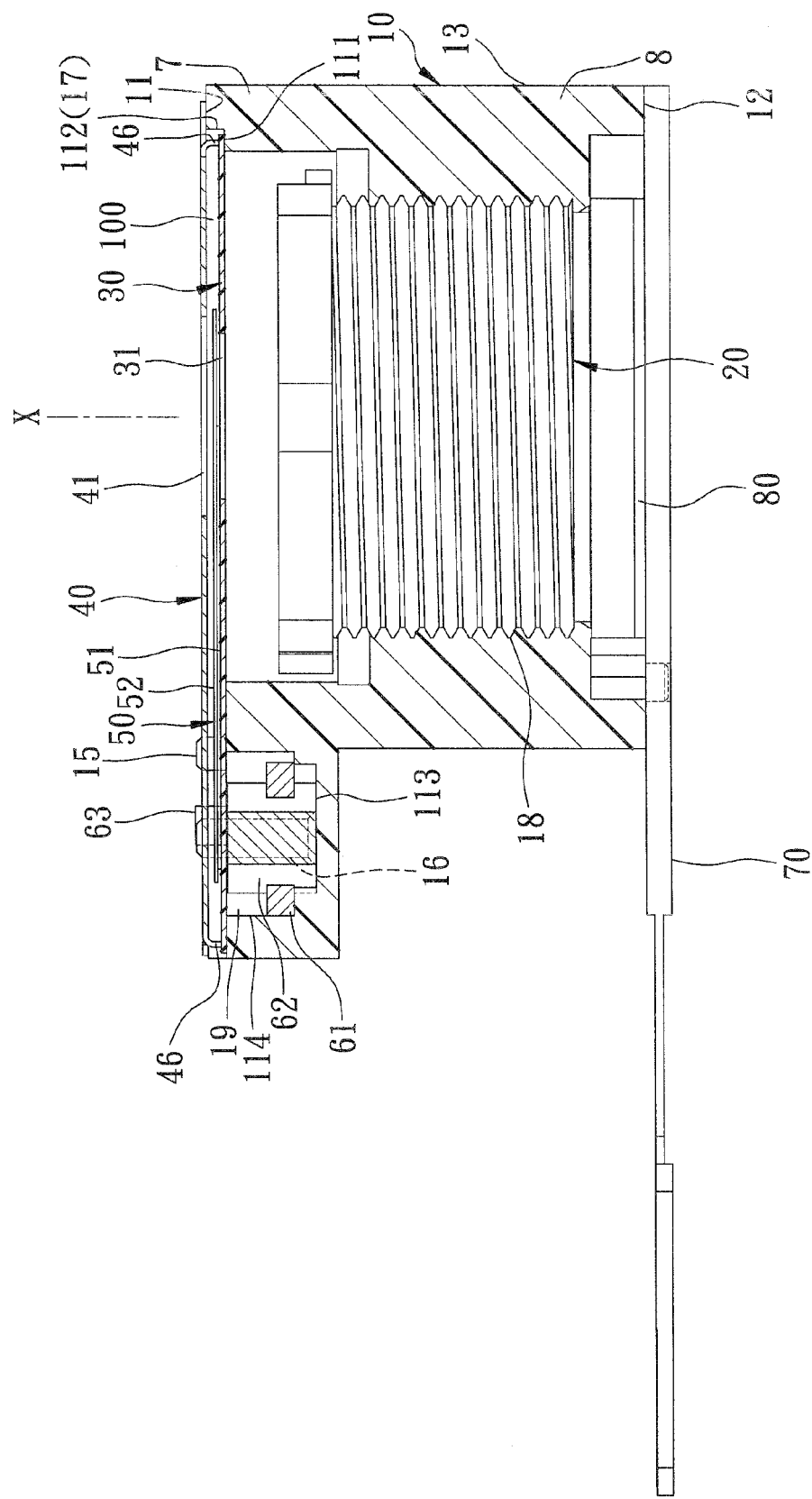
FIG. 4 is a sectional view of the lens device of the preferred embodiment taken along line IV-IV in FIG. 3.

Referring to FIGS. 2, 3, and 4, a preferred embodiment of a lens device according to the present invention is shown to comprise a base 10, a lens unit 20, a dividing plate 30, a cover plate 40, a shutter unit 50, an actuator unit 60, a flexible printed circuit board 70, and an image sensor 80.

Figure 5:
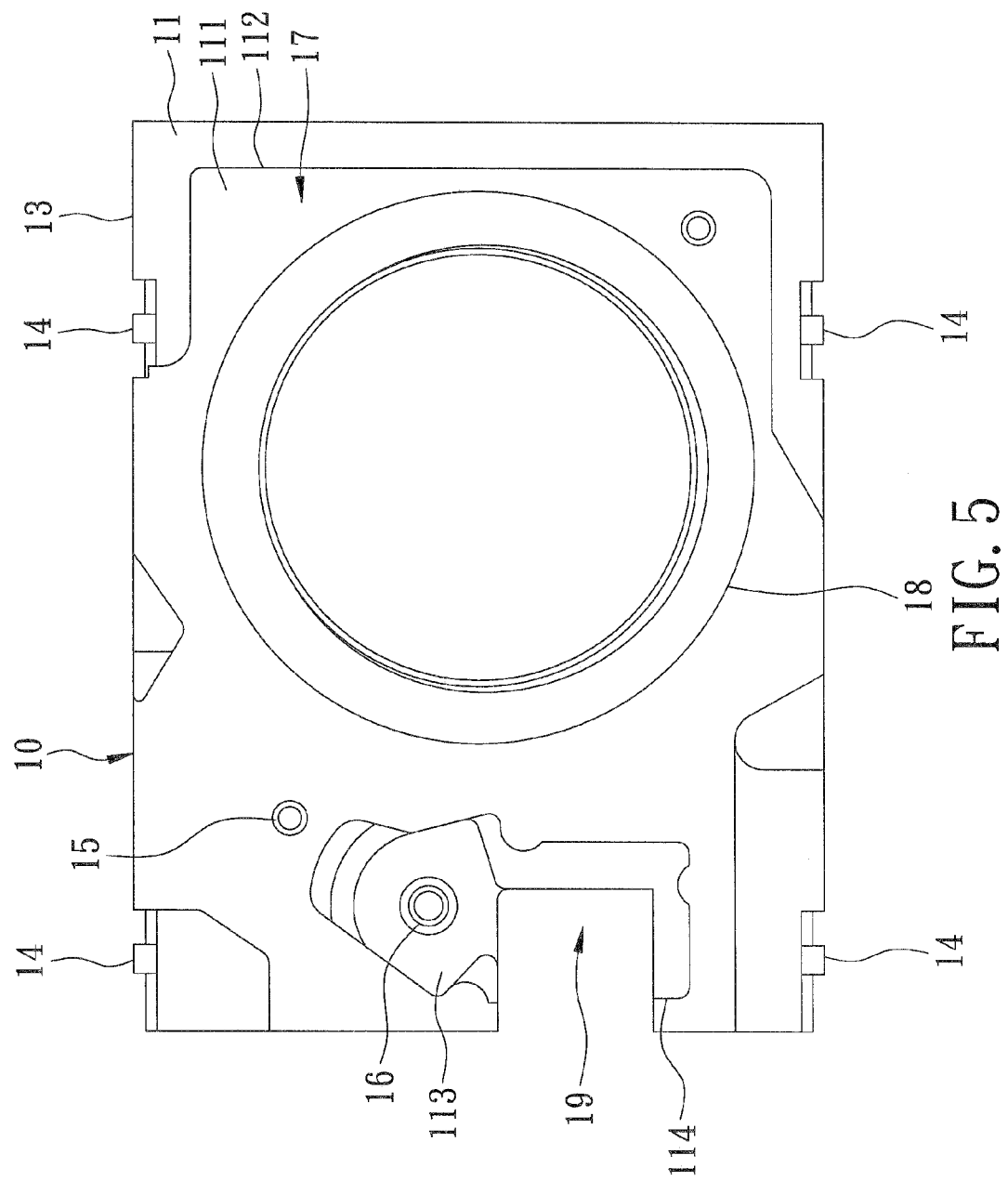
FIG. 5 is a front view of a base of the lens device of the preferred embodiment.

Referring to FIGS. 2, 4, and 5, the base 10 has a front section 7 with a front surface 11, a rear section 8 with a rear surface 12, a connecting surface 13 that interconnects the front and rear surfaces 11, 12, a plurality of protrusions 14 that are formed on the connecting surface 13, an indented section 17 that is formed inwardly from the front surface 11, a lens hole 18 that extends through the front and rear sections 7,8 along an axial direction (X) of the base 10, and a mounting space 19 that is formed inwardly from the front section 7 and that is spaced apart from the lens hole 18.

The base 10 also has a first bottom wall 111 defining a bottom surface of the indented section 17, a first surrounding wall 112 defining a surrounding wall surface of the indented section 17 and interconnecting the first bottom wall 111 and the front surface 11, a second bottom wall 113 defining a bottom surface of the mounting space 19, and a second surrounding wall 114 defining a surrounding wall surface of the mounting space 19 and interconnecting the second bottom wall 113 and the first bottom wall 111. The lens hole 18 extends through the rear surface 12 and the first bottom wall 111. The mounting space 19 is formed inwardly from the first bottom wall 111.

Referring to FIGS. 2 and 4, the lens unit 20 is disposed in the lens hole 18, includes a lens barrel 21 and a plurality of lenses 22, and has an optical axis. The lens barrel 21 is threadedly connected to the base 10 in the lens hole 18. The lenses 22 are disposed in the lens barrel 21.

Referring to FIGS. 2 and 4, the dividing plate 30 is mounted on the front section 7 of the base 10 within the indented section 17. In this embodiment, the dividing plate 30 abuts against the first bottom wall 111. The dividing plate 30 has a first light hole 31 aligned with the optical axis of the lens unit 20, a first hole 32, a second hole 33, and a first guide slot 34.

Referring to FIGS. 2, 3, and 4, the cover plate 40 is mounted on the front section 7 of the base 10, and has a second light hole 41 aligned with the first light hole 31, a third hole 42, a fourth hole 43, and a second guide slot 44. The cover plate 40 includes a plurality of clasps 45 that extend rearwardly and oppose the respective protrusions 14, and a pair of support legs 46 that extend rearwardly and abut against the dividing plate 30. The clasps 45 clasp the respective protrusions 14 such that the cover plate 40 can be positioned securely on the base 10. The dividing plate 30 and the cover plate 40 define a working space 100 therebetween due to the formation of the support legs 46.

Referring to FIGS. 2 and 4, the shutter unit 50 includes a first shutter piece 51 and a second shutter piece 52 pivotally disposed in the working space 100. The first shutter piece 51 has a first fastener hole 511 and a first control hole 512, and the second shutter piece 52 has a second fastener hole 521 and a second control hole 522.

Referring to FIGS. 2, 3, and 4, the base 10 includes a first pillar 15 that protrudes from the first bottom wall 111 and extends through the first hole 32, the first fastener hole 511, and the third hole 42, and a second pillar 16 that protrudes from the second bottom wall 113 and extends through the second hole 33, the second fastener hole 521, and the fourth hole 43.

Referring to FIGS. 2 and 4, the actuator unit 60 is mounted in the mounting space 19, and includes a rotation portion 62, an electromagnetic actuator 61 that drives the rotation portion 62, and an operating portion 63 that is formed on the rotation portion 62, that extends into the working space 100, and that is capable of rotating about the second pillar 16 as a result of rotational movement of the rotation portion 62. In this embodiment, the electromagnetic actuator 61 includes an electromagnet, and the rotation portion 62 includes a permanent magnet.

Figure 6:
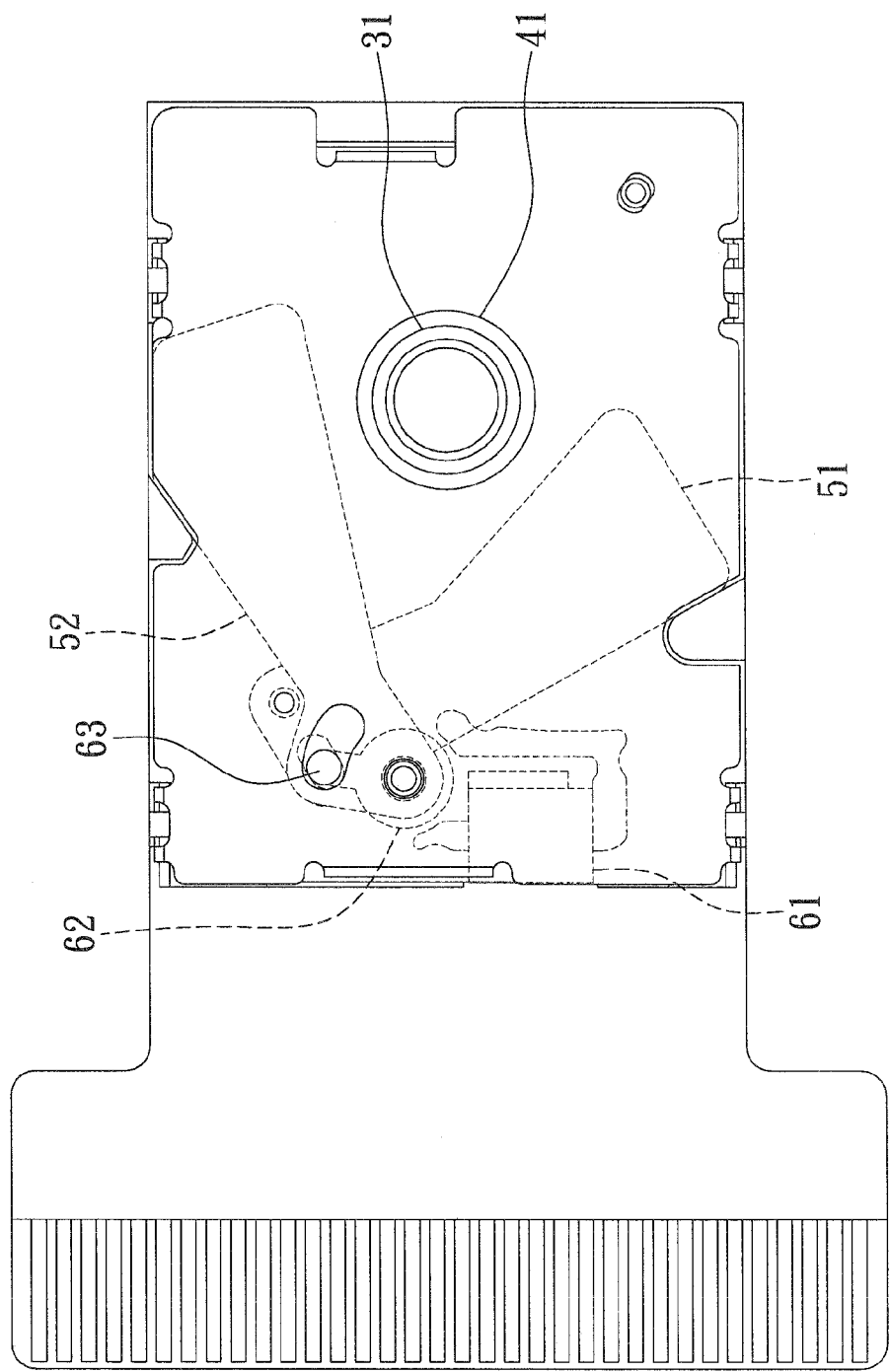
FIG. 6 is a front view of the preferred embodiment to illustrate a shutter unit of the lens device at an open position.
Figure 7:
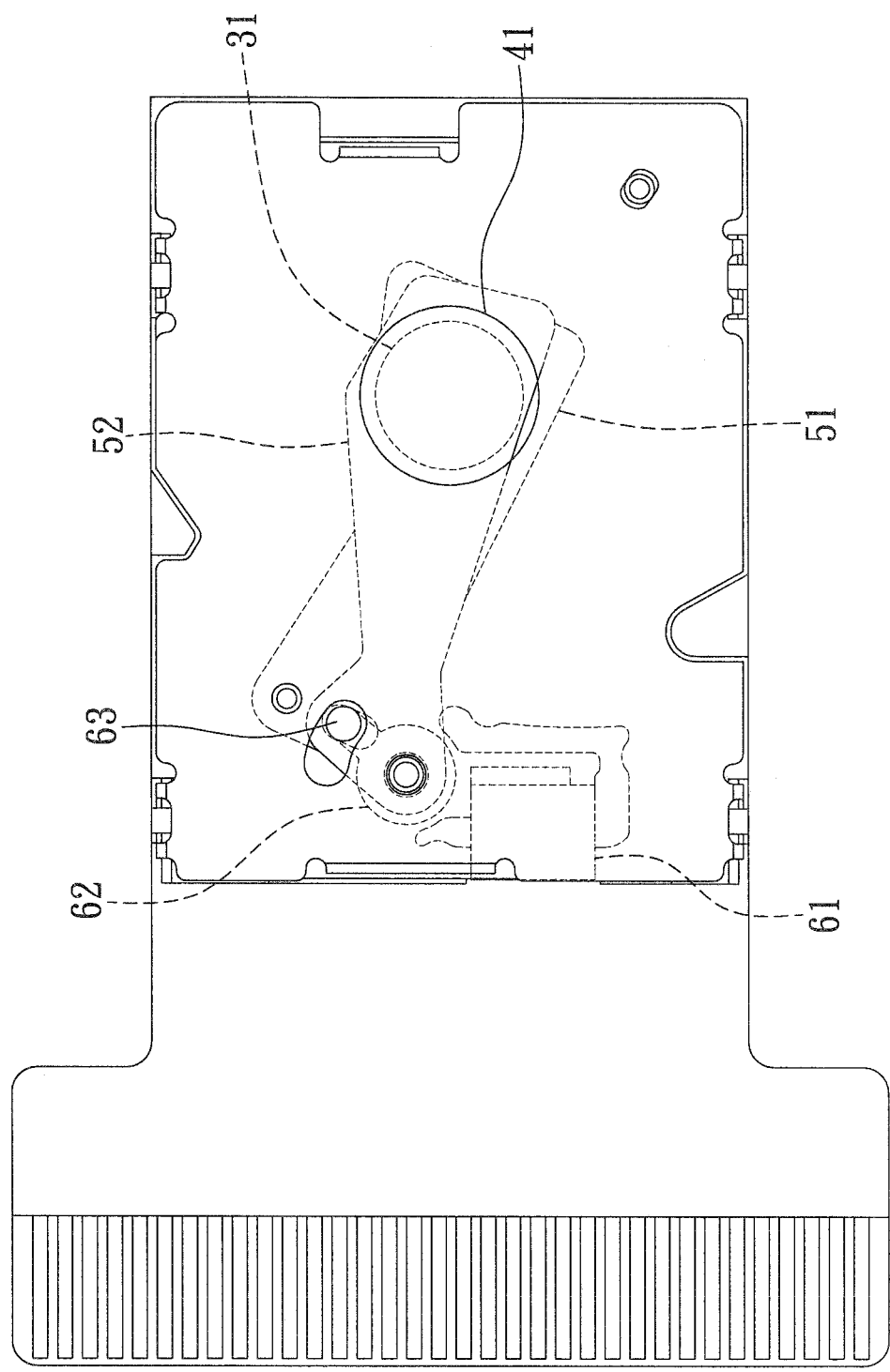
FIG. 7 is a front view of the preferred embodiment to illustrate the shutter unit of the lens device at a closed position.

The rotation portion 62 is rotatably disposed on the second pillar 16, and the operating portion 63 extends through the first and second guide slots 34, 44 as well as through the first control hole 512 of the first shutter piece 51 and the second control hole 522 of the second shutter piece 52 such that driving of the operating portion 63 by the rotation portion 62 moves both of the first and second shutter pieces 51, 52 between an open position away from the first and second light holes 31, 41 as shown in FIG. 6, and a closed position covering the first and second light holes 31, 41 as shown in FIG. 7.

Referring to FIGS. 2, 3, and 4, the flexible printed circuit board 70 is disposed on the rear surface 12 of the base 10. The image sensor 80 is electrically connected to the flexible printed circuit board 70, and opposes the lens unit 20.

In sum, the advantages of the present invention can be summarized as follows:

i) The actuator unit 60 and the lens unit 20 of the present invention are both mounted in the base 10, and are not exposed therefrom. Compared to the prior art, the present invention does not need screws to secure the actuator unit 60. In addition, the actuator unit 60 is not exposed outside the base 10 such that when the present invention is mounted in a cell phone, the arrangement of other internal components of the cell phone are not affected.

ii) The cover plate 40 of the present invention clasps the base 10 directly. Compared to the prior art, the present invention does not need screws to secure the cover plate 40, which facilitates assembly and saves time.

iii) The dividing plate 30 of the present invention is received within the indented section 17 of the base 10. Furthermore, the shutter unit 50 is also located in the indented section 17. As a result, the dividing plate 30 and the shutter unit 50 do not increase the overall thickness along the axial direction (X) of the present invention. Therefore, compared to the prior art, the overall thickness of the present invention when all the elements of the lens device are assembled together is reduced, thereby minimizing the amount of space in a cell phone used by the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device comprising:
   a base having a front section with a front surface, a rear section with a rear surface, a lens hole that extends through said front and rear sections along an axial direction of said base, and a mounting space that is formed inwardly from said front section and that is spaced apart from said lens hole;
   a lens unit that is disposed in said lens hole, that includes a lens, and that has an optical axis;
   a dividing plate that directly abuts against said front section of said base, and that has a first light hole aligned with the optical axis of said lens unit;
   a cover plate that is mounted securely on said front section of said base, and that has a second light hole aligned with said first light hole, said dividing plate and said cover plate defining a working space therebetween;
   a shutter unit that includes a first shutter piece pivotally disposed in said working space;
   an actuator unit that is mounted securely in said mounting space, and that includes a rotation portion, and an operating portion formed on said rotation portion and extending into said working space, said operating portion being linked with said first shutter piece and being driven by said rotation portion to move said first shutter piece between an open position away from said first and second light holes and a closed position covering said first and second light holes; and
   a flexible printed circuit board and an image sensor, said flexible printed circuit board being disposed on said rear surface of said base, said image sensor being electrically connected to said flexible printed circuit board and opposing said lens unit.

2. The lens device as claimed in claim 1, wherein said base further includes an indented section formed inwardly from said front surface, said dividing plate being mounted in said indented section.

3. The lens device as claimed in claim 2, wherein said base has a first bottom wall defining a bottom surface of said indented section, and a first surrounding wall defining a surrounding wall surface of said indented section and interconnecting said first bottom wall and said front surface, said lens hole extending through said rear surface and said first bottom wall, said mounting space being formed inwardly from said first bottom wall.

4. The lens device as claimed in claim 3, wherein said base further has a connecting surface that interconnects said front and rear surfaces, at least one protrusion being formed on said connecting surface, said cover plate including at least one clasp that extends rearwardly and opposes said protrusion, said clasp clasping said protrusion.

5. The lens device as claimed in claim 4, wherein said cover plate includes a pair of support legs that extend rearwardly and that abut against said dividing plate.

6. The lens device as claimed in claim 3, wherein said base has a second bottom wall defining a bottom surface of said mounting space, and a second surrounding wall defining a surrounding wall surface of said mounting space and interconnecting said second bottom wall and said first bottom wall.

7. The lens device as claimed in claim 6, wherein:
   said dividing plate has a first hole, a second hole, and a first guide slot;
   said cover plate has a third hole, a fourth hole, and a second guide slot;
   said first shutter piece of said shutter unit has a first fastener hole, and a first control hole;
   said shutter unit further includes a second shutter piece having a second fastener hole, and a second control hole;
   said base includes a first pillar that protrudes from said first bottom wall and extends through said first hole, said first fastener hole, and said third hole, and a second pillar that protrudes from said second bottom wall and extends through said second hole, said second fastener hole, and said fourth hole; and
   said rotation portion is disposed on said second pillar, and said operating portion extends through said first and second guide slots as well as through said first and second control holes such that driving of said operating portion by said rotation portion moves both of said first and second shutter pieces between an open position away from said first and second light holes and a closed position covering said first and second light holes.

8. The lens device as claimed in claim 3, wherein said actuator unit is mounted securely and immovably in said mounting space.

9. The lens device as claim in claim 1, wherein said lens unit further includes a lens barrel threadedly connected to said base in said lens hole, said lens being disposed in said lens barrel.

10. The lens device as claimed in claim 1, wherein said actuator unit further includes an electromagnetic actuator that drives said rotation portion.

11. The lens device as claimed in claim 1, wherein said cover plate is mounted securely and immovably on said first section of said base.

12. The lens device as claimed in claim 1, wherein said dividing plate is clamped immovably between said base and said cover plate.

* * * * *